United States Patent [19]
Lin

[11] Patent Number: 6,023,370
[45] Date of Patent: Feb. 8, 2000

[54] LIGHT POLARIZING DEVICE FOR GENERATING A POLARIZED LIGHT WITH DIFFERENT POLARIZATIONS

[75] Inventor: Shang-Yi Lin, Taipei, Taiwan

[73] Assignee: Primax Electronics Ltd., Hsien, Taiwan

[21] Appl. No.: 09/087,325

[22] Filed: May 29, 1998

[51] Int. Cl.$^7$ ........................................... G02B 5/30
[52] U.S. Cl. ........................ 359/487; 359/483; 359/495; 349/8; 349/9
[58] Field of Search ........................ 349/8, 9, 97; 353/20; 359/487, 494, 495, 502, 483

[56] References Cited

U.S. PATENT DOCUMENTS 5,877,824  3/1999  Sarayeddine ................................. 349/8

*Primary Examiner*—Cassandra Spyrou
*Assistant Examiner*—Craig Curtis

[57] ABSTRACT

The present invention provides a light polarizing device comprising a light separating module and a retarder for converting an input trichrome unpolarized light having red, green and blue lights. The light separating module comprises a polarization beam splitter film and a dichroic film for separating the input trichrome unpolarized light into two trichrome polarized lights with different polarizations, each color light within the first trichrome polarized light and the second trichrome polarized light having a unique polarization. The retarder retards the first trichrome polarized light or the second trichrome polarized light so as to generate an output of trichrome polarized light with different polarizations. Furthermore, the light separating module is a stackable module that can be vertically stacked with other modules to form a light separating panel.

14 Claims, 4 Drawing Sheets

LIGHT POLARIZING DEVICE FOR GENERATING A POLARIZED LIGHT WITH DIFFERENT POLARIZATIONS

BACKGROUND OF THE INVENTION

1. Field of the Invention

The invention relates to a light polarizing device, and more specifically, to a light polarizing device for converting a trichrome unpolarized light into a trichrome polarized light with different polarizations.

2. Description of the Prior Art

Commonly, images are displayed by a projecting device by projection onto a large screen. Therefore, a strong light intensity must be used to maintain a clear image. For optimal effect, most projecting devices must be equipped with specific optical components that emit polarized light such as a monochrome liquid crystal display or a polarization beam splitter film. Hence it is important to optimize the polarizations of an incandescent light beam and the arrangement of the optical path of the separated polarized light beams as well as performing the two stages separately but sequentially in order to simplify the structure and procedure of the projecting device, lower manufacturing cost and improve image quality.

Therefore, the most central objective of the present invention is to provide a light polarizing device which converts a trichrome unpolarized light emitted from a white light source into a trichrome polarized light wherein at least one of the three output color lights has a different polarization from the other two color lights.

SUMMARY OF THE INVENTION

It is therefore a primary objective of the present invention to provide a projecting device to solve the above mentioned problem.

Briefly, in a preferred embodiment, the present invention provides a light polarizing device for converting an input trichrome unpolarized light having red, green and blue lights, the light polarizing device comprising:

a light separating module having a polarization beam splitter film and a dichroic film for separating the input trichrome unpolarized light into two trichrome polarized lights with different polarizations, the polarization of each color light within the first trichrome polarized light being different from the polarization of a corresponding color light within the second trichrome polarized light; and a retarder for retarding the first trichrome polarized light or the second trichrome polarized light so as to generate an output of trichrome polarized light with different polarizations.

It is an advantage of the present invention that the light separating device has a very simple structure and can convert an input trichrome unpolarized light into trichrome polarized light with different polarizations.

It is another advantage of the present invention that the light separating device can simplify the structure of the projecting device, and it can further provide the projecting device with a lower manufacturing cost, and better image quality.

These and other objects and the advantages of the present invention will no doubt become obvious to those of ordinary skill in the art after having read the following detailed description of the preferred embodiment that is illustrated in the various figures and drawings.

Each of FIGS. 2 to 7 is a schematic diagram for six different embodiments the light separating module according to the present invention.

DETAILED DESCRIPTION OF THE PREFERRED EMBODIMENT

Figure 1:
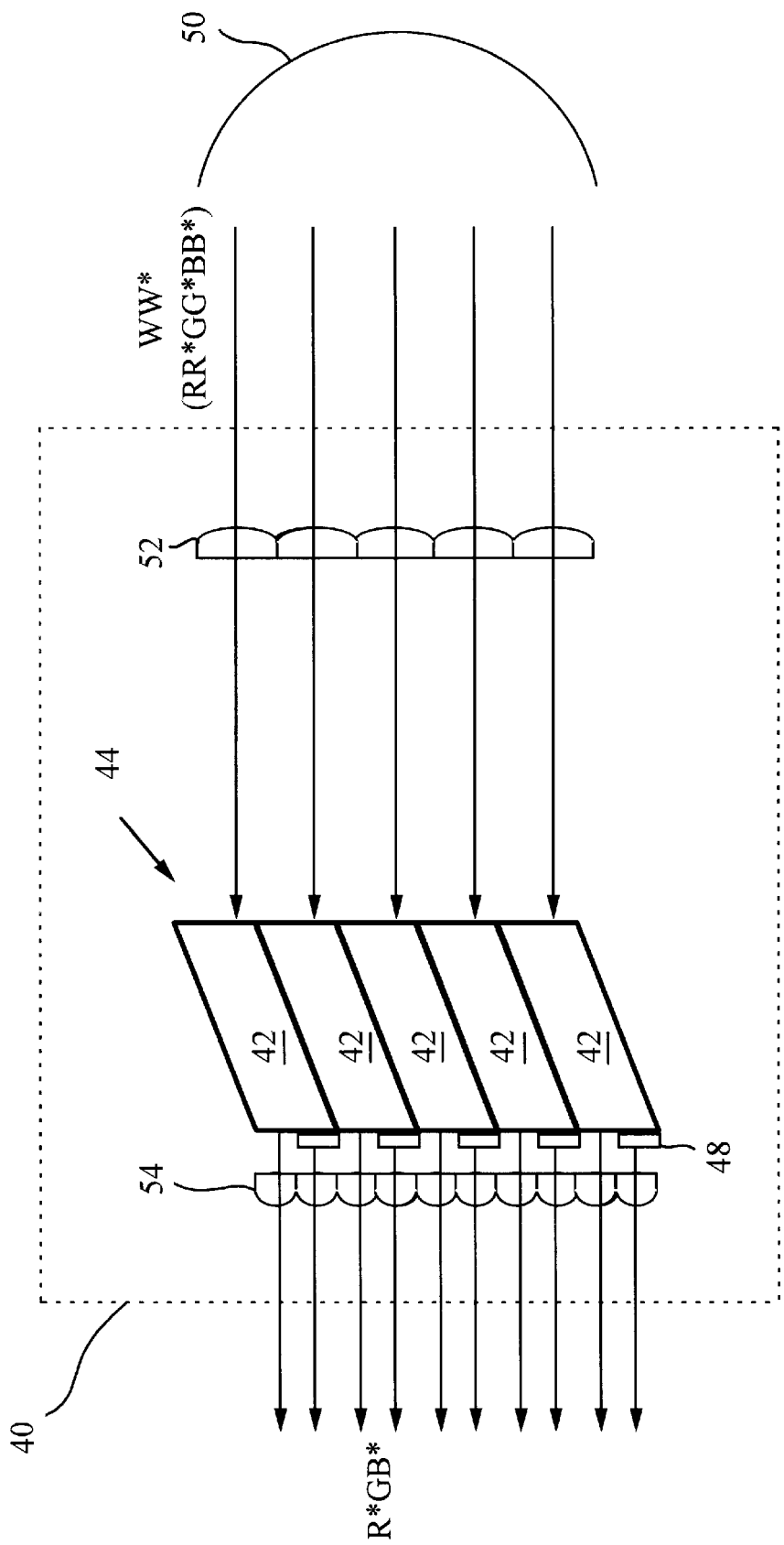
FIG. 1 is a perspective view of a light polarizing device according to the present invention.

Please refer to FIG. 1. FIG. 1 is a perspective view of the light polarizing device 40 of the present invention. The light polarizing device 40 has a plurality of light separating modules vertically stacked together forming a light separating panel for converting an input trichrome unpolarized light WW* (RR*GG*BB*) emitted from a light source 50 into a trichrome polarized R*GB* light with a unique polarization, a focusing device 52 consisting of a plurality of rectangular optical integrators installed in front of the light source 50 for converging the trichrome unpolarized light from the light source 50 onto the corresponding input side of each light separating module 42, a half-wave retarder 48 installed next to the output of each light separating module 42 for retarding one or two trichrome polarized lights from each light separating module 42 and unifying the polarizations of each trichrome polarized light R*GB*, and a uniform illumination optical device 54 installed next to the output side of the light separating panel 44 for converting the output trichrome polarized light into a uniformly distributed trichrome polarized light R*GB*.

Figure 2:
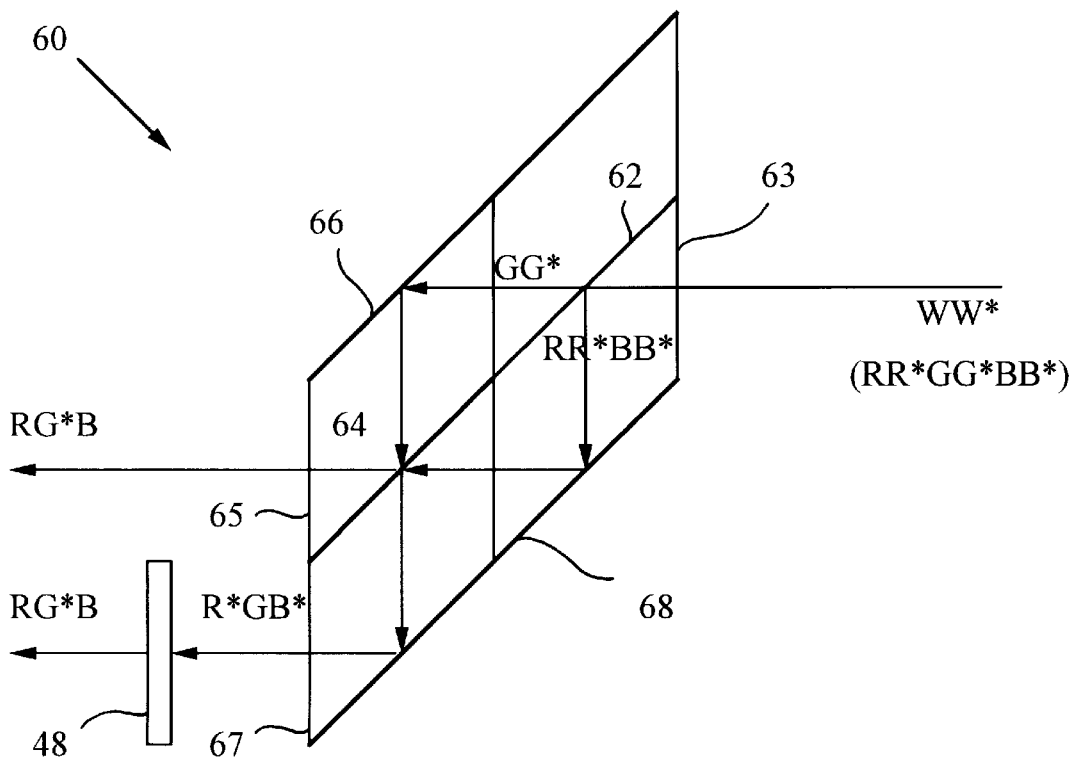

Please refer to FIG. 2. FIG. 2 is a schematic diagram of one embodiment 60 of the light separating module 42 shown in FIG. 1 according to the present invention. The light separating module 42 of FIG. 1 uses optical components such as a dichroic film, a polarization beam splitter film or a reflecting mirror to convert the input trichrome unpolarized light WW* (RR*GG*BB*) into the trichrome polarized light RG*B. The light separating module 60 of FIG. 2 comprises a dichroic film 62, a polarization beam splitter film 64, two reflecting mirrors 66 and 68, and an input side 63 in parallel to the first and second output sides 65 and 67 which are juxtaposed with each other. The trichrome unpolarized light WW*(RR*BB*GG*) passes through the input side 63 of the light separating module 60 and strikes the dichroic film 62 where it is separated into green unpolarized light G* and dichromatic unpolarized light RR*BB*. The green unpolarized light GG* is passed to the reflecting mirror 66 where it is reflected to the polarization beam splitter film 64. The dichromatic unpolarized light RR*BB* is reflected by the dichroic film 62 to the reflecting mirror 68 where it is reflected to the opposing side of the polarization beam splitter film 64. The polarization beam splitter film 64 contains a special coating which enables it to reflect an S-state polarized light and pass a P-state polarized light so that the green polarized light G* is reflected while the dichromatic polarized light RB passes through the polarization beam splitter film 64. The combined two light beams form the trichrome polarized light RG*B which passes through the output side 65 of the light separating module 60. Similarly, the polarization beam splitter film 64 passes the green polarized light G and reflects the dichromatic polarized light R*B* forming the trichrome polarized light R*GB* that passes through the output side 65 of the light separating module 60 and through the half-wave retarder 48 where it is retarded and converted into the trichrome polarized light RG*B and output in parallel with the trichrome polarized light RG*B emitted from the output side 65 of the light separating module 60.

Figure 3:
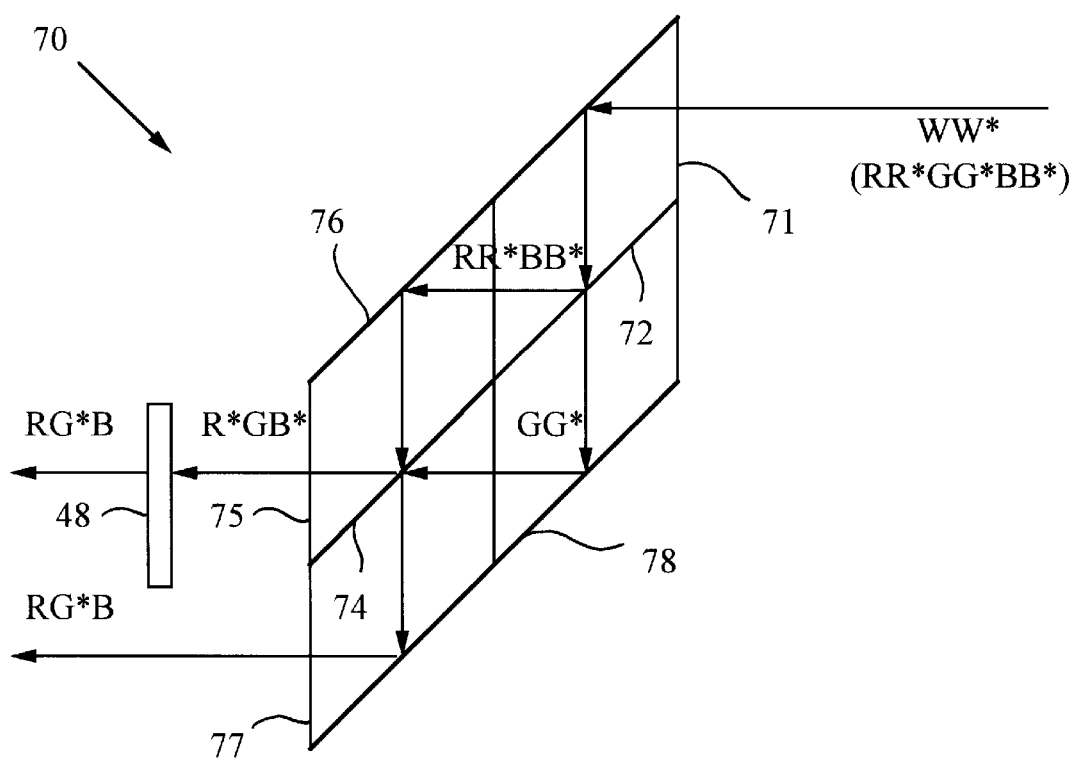

Please refer to FIG. 3 which shows a schematic diagram for an alternative embodiment of the light separating module 42 according to the present invention. The light separating module 70 similarly comprises a dichroic film 72, a polarization beam splitter film 74, two reflecting mirrors 76 and 78, and an input side 71 and two output sides 75 and 77. The primary difference between the light separating module 70 and light separating module 60 is the orientation of the input trichrome unpolarized light WW*(RR*GG*BB*) and the traveling optical path of the light beams. In the light separating module 70, the trichrome unpolarized light WW* (RR*GG*BB*) is emitted through the input side 71 above the dichroic film 72 and reflected by the reflecting mirror 76 thus altering the course of the optical path. Furthermore, the half-wave retarder 48 is installed next to the upper output side 75 as opposed to the lower output side 77. The installation of the retarder 48 next to the upper output side 75 or the lower output side 77 is dependent only on the polarizations of the light beams and has no other fixed restrictions.

Figure 4:
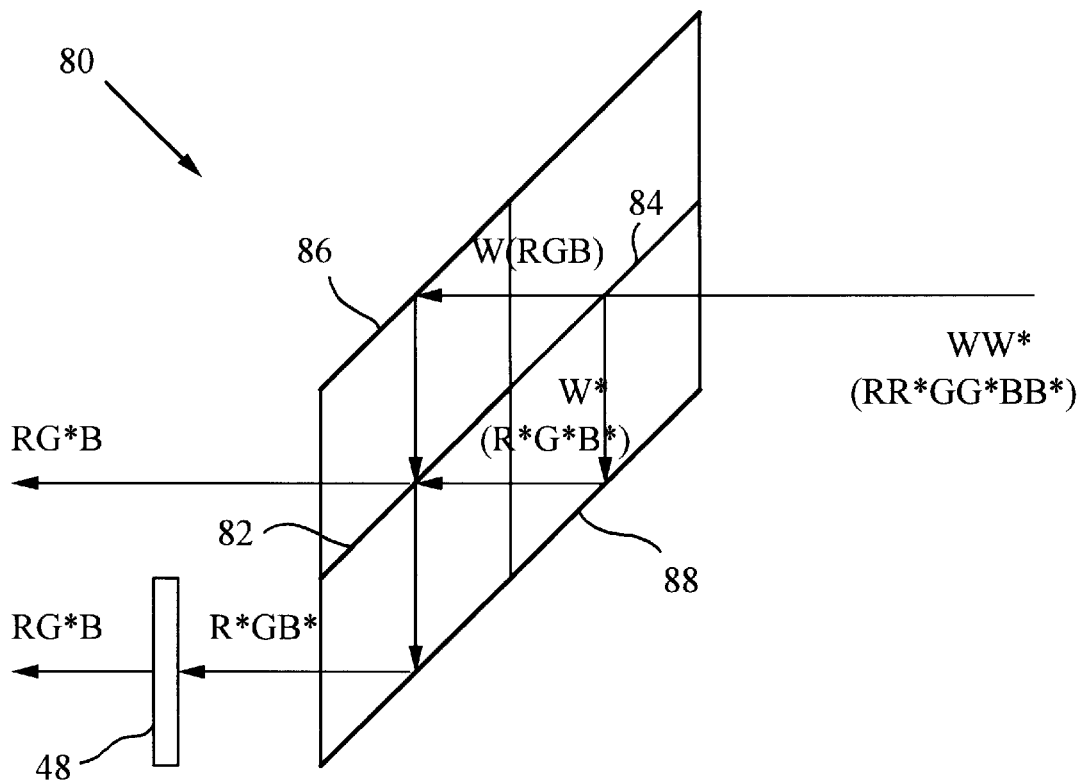
Figure 5:
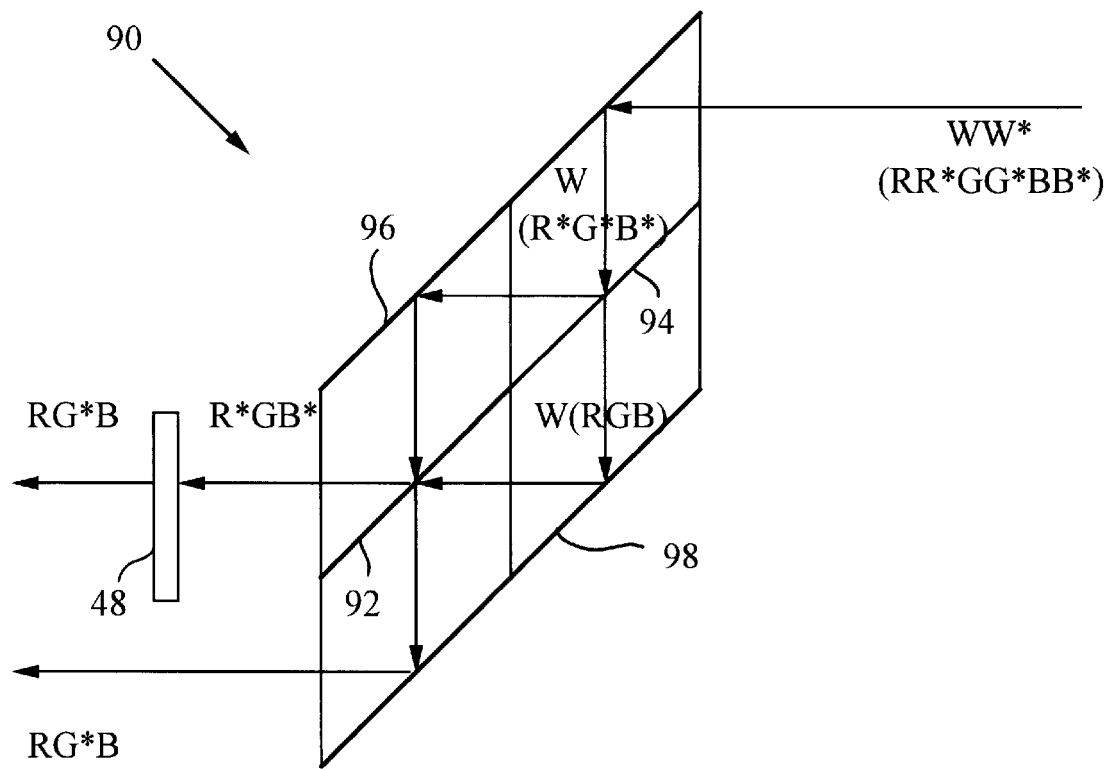

Please refer to FIG. 4 and FIG. 5. FIGS. 4 and 5 show schematic diagrams for the third and fourth embodiments 80 and 90 of the light separating module 42. In this design, the polarized light beams are first separated by their polarizations and is therefore different from the two aforementioned embodiments. The two dichroic films 82, 92 are positioned behind the polarization beam splitter films 84, 94 which alters the arrangement of optical path. Consequently, the trichrome unpolarized light WW* (RR*GG*BB*) is separated into the trichrome polarized light RGB and trichrome polarized light R*G*B* by the polarization beam splitter films 84, 94 respectively then reflected to dichroic films 82, 92 by reflecting mirrors 86, 88 or 96, 98. In these embodiments, the dichroic films 82, 92 pass the dichromatic polarized lights RB and R*B* and reflect the monochrome polarized light G and G* and ultimately emit two parallel trichrome polarized lights RG*B.

Dichroic films 62, 72, 82 and 92 separate the input light beam and reflect or pass light by utilizing the filtration of wavelength. Light may appear to be the same in color, however, the wavelength of P-state polarized light and that of S-state polarized light differ by approximately 20 nm. The light separating modules 60, 70, 80 and 90 use a single dichroic film 62, 72, 82 or 92 to separate two kinds of polarized light. Although this simplifies the structure, color misregistrations of the output trichrome polarized light may occur. This problem may be eliminated by using a plurality of dichroic films in the light separating module to filter lights of varying color or polarizations.

Figure 6:
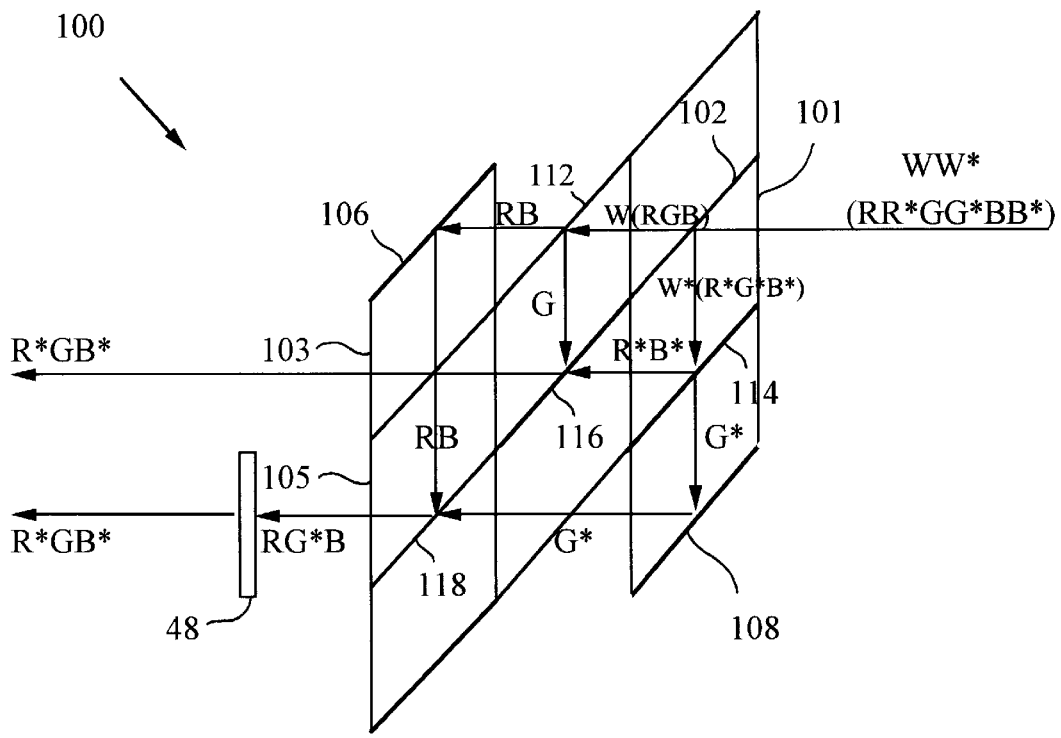
Figure 7:
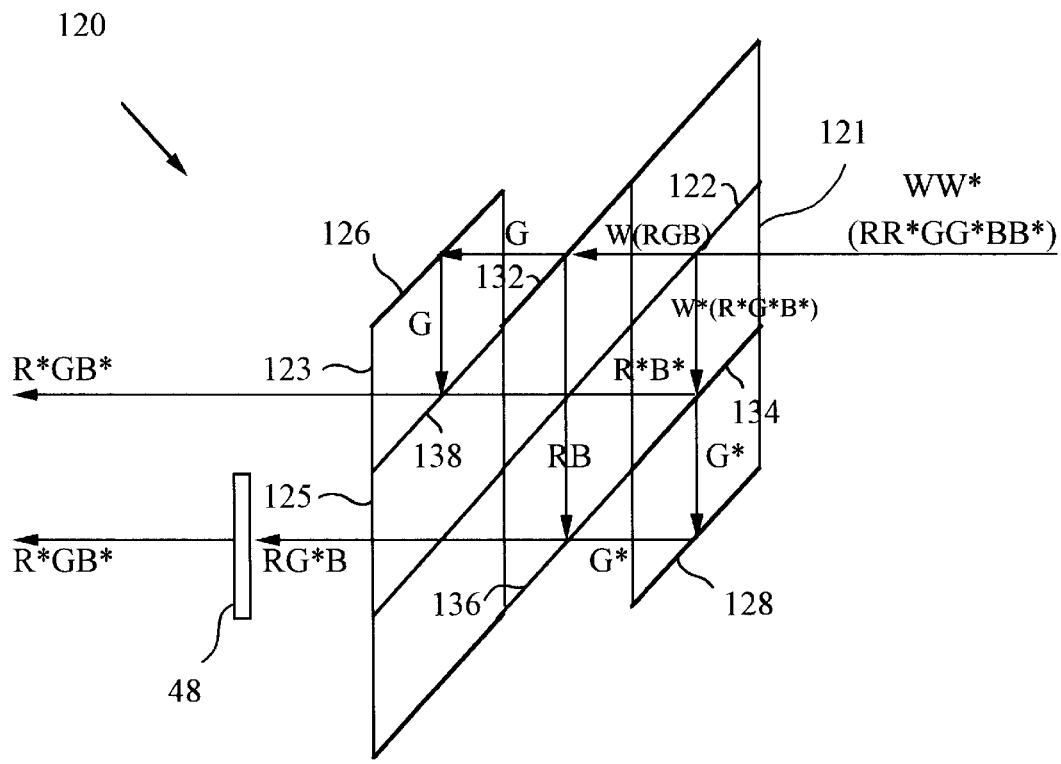

Please refer to FIG. 6 and FIG. 7. FIGS. 6 and 7 are schematic diagrams of the fifth and sixth embodiments 100 and 120 of the light separating module 42. The light separating module 100 shown in FIG. 6 comprises a polarization beam splitter film 102, a first dichroic film 112, a second dichroic film 114, a third dichroic film 116, a fourth dichroic film 118, two reflecting mirrors 106 and 108, an input side 101 and two output sides 103 and 105. The input trichrome unpolarized light WW* (RR*GG*BB*) is emitted through the input side 101 of the light separating module 100 and strikes the polarization beam splitter film 102 where it is separated into two parts by reflecting the S-state polarized light W*(R*G*B*) and passing the trichrome unpolarized light WW* (RR*GG*BB*). The green polarized light G reflected from the first dichroic film 112 and the dichromatic polarized light R*B* reflected from the second dichroic film 114 strike the opposing sides of the third dichroic film 116 where the two light components are synthesized into trichrome polarized light R*GB*. Similarly, the dichromatic polarized light RB and green polarized light G* are reflected by the reflecting mirrors 106, 108 then synthesized by the fourth dichroic mirror 118 into the trichrome polarized light RG*B. This light is passed through the half-wave retarder 48 and retarded and modulated into the trichrome polarized light R*GB*. Likewise, the light separating module 120 shown in FIG. 7 comprises a polarization beam splitter film 122, four dichroic films 132, 134, 136, and 138, two reflecting mirrors 126 and 128, an input side 121 and two output sides 123, 125. The composition of the first dichroic film 132 of the light separating module 120 differs from the composition of the first dichroic film 112 of the light separating module 100. As a result, the polarized lights follow a different optical path through the arrangement of the third dichroic film 136 and the fourth dichroic film 138.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A light polarizing device for converting an input trichrome unpolarized light having red, green and blue lights, the light polarizing device comprising:

a light separating module having a polarization beam splitter film and a dichroic film for separating the input trichrome unpolarized light into two trichrome polarized lights with different polarizations, the polarization of each color light within the first trichrome polarized light being different from the polarization of a corresponding color light within the second trichrome polarized light; and a retarder for retarding the phase of the first trichrome polarized light or the second trichrome polarized light so as to generate an output of trichrome polarized light with different polarizations.

2. The light polarizing device of claim 1 wherein the light separating module comprises an input side for input of the trichrome unpolarized light beam, and first and second output sides juxtaposed with each other for separately and respectively outputting the first and second trichrome polarized lights in parallel.

3. The light polarizing device of claim 2 wherein the retarder is a half-wave retarder installed next to the first or second output side of the light separating module for retarding the phase of the first or second trichrome polarized light by a half wavelength.

4. The light polarizing device of claim 2 further comprising a focusing device installed next to the input side of the light separating module for focusing the trichrome unpolarized light emitted from the light source onto the input side of the light separating module.

5. The light polarizing device of claim 2 further comprising a uniform illumination optical device installed next to the first and second output sides of the light separating module for converting the output trichrome polarized light into a uniformly distributed trichrome polarized light.

6. The light polarizing device of claim 2 wherein the input side is parallel to the two output sides of the light separating module, and wherein the trichrome unpolarized light from the light source passed through the input side is perpendicular to the input side.

7. The light polarizing device of claim 6 comprising a plurality of light separating modules vertically stacked together which forms a light separating panel.

8. The light polarizing device of claim 2 wherein the dichroic film of the light separating module divides the input trichrome unpolarized light into two unpolarized lights of different colors which follow two separate optical paths to the two opposite sides of the polarization beam splitter film to form the first and second trichrome polarized lights respectively.

9. The light polarizing device of claim 8 wherein the two unpolarized lights of different colors from the dichroic film pass through the two opposite sides of the polarization beam splitter film along ±45° incident angles to form the first trichrome polarized light and the second trichrome polarized light respectively.

10. The light polarizing device of claim 2 wherein the polarization beam splitter film of the light separating module separates the trichrome unpolarized light emitted from the input side into two trichrome polarized lights which simultaneously pass through a dichroic film along two separate paths to form the first trichrome polarized light and second trichrome polarized light, respectively.

11. The light polarizing device of claim 10 wherein the two polarized light beams generated by the polarization beam splitter film pass through the two opposite sides of the dichroic film along ±45° incident angles to form the first trichrome polarized light and the second trichrome polarized light respectively.

12. The light polarizing device of claim 2 wherein the light separating module comprises a first, second, third, and fourth dichroic film, and wherein the polarization beam splitter film of the light separating module separates the input trichrome unpolarized light into a first light beam and a second light beam, the first dichroic film separates the first light beam into a first color light and a second color light, the second dichroic film separates the second light beam into a third color light and a fourth color light, the third dichroic film synthesizes the first color light and the third color light into the first trichrome polarized light, and the fourth dichroic film synthesizes the second color light and the fourth color light into the second trichrome polarized light.

13. The light polarizing device of claim 12 wherein the first color light and the third color light pass through the two opposite sides of the third dichroic film along ±45° incident angles to form the first trichrome polarized light.

14. The light polarizing device of claim 12 wherein the second color light and the fourth color light pass through the two opposite sides of the fourth dichroic film along ±45° incident angles to form the second trichrome polarized light.

* * * * *